US012662041B2

(12) United States Patent
Zhu et al.

(10) Patent No.: US 12,662,041 B2
(45) Date of Patent: Jun. 23, 2026

(54) VEHICLE DOLLY

(71) Applicants: Zhengzhong Zhu, Yuhuan City (CN); Zhiguo Liu, Yuhuan City (CN); Zhifang Jin, Yuhuan City (CN); Gang Chen, Yuhuan City (CN); Xiao Jiang, Yuhuan City (CN)

(72) Inventors: Zhengzhong Zhu, Yuhuan City (CN); Zhiguo Liu, Yuhuan City (CN); Zhifang Jin, Yuhuan City (CN); Gang Chen, Yuhuan City (CN); Xiao Jiang, Yuhuan City (CN)

(73) Assignee: ZheJiang TOPSUN Logistics Control Co., Ltd., Yuhan City (CN)

( * ) Notice: Subject to any disclaimer, the term of this patent is extended or adjusted under 35 U.S.C. 154(b) by 288 days.

(21) Appl. No.: 18/646,884

(22) Filed: Apr. 26, 2024

(65) Prior Publication Data

US 2025/0083586 A1     Mar. 13, 2025

(30) Foreign Application Priority Data

Sep. 13, 2023    (CN) .......................... 202311183594.X
Sep. 13, 2023    (CN) .......................... 202322492031.0

(51) Int. Cl.
*B60P 1/00* (2006.01)
*B60P 3/12* (2006.01)

(52) U.S. Cl.
CPC .................................... *B60P 3/127* (2013.01)

(58) Field of Classification Search
CPC .................................. B60P 1/00; B60P 3/127
See application file for complete search history.

(56) References Cited

U.S. PATENT DOCUMENTS 2,470,054 A * 5/1949 Schildmeier .......... B60B 29/002
                                                          414/537
2,943,863 A * 7/1960 Flournoy ................ B60P 3/127
                                                          280/47.131

(Continued)

FOREIGN PATENT DOCUMENTS

CN          204586832 U      8/2015
CN          213323043 U      6/2021

(Continued)

*Primary Examiner* — Marc Q Jimenez
*Assistant Examiner* — James J Triggs
(74) *Attorney, Agent, or Firm* — Minder Law Group; Willy H. Wong

(57)          ABSTRACT

A vehicle dolly comprises two parallel lifting axle assemblies and two wheel assemblies, two ends of each of the lifting axle assemblies being detachably connected to the two wheel assemblies, each of the wheel assemblies comprising: a main beam; a first support wheel and a second support wheel; a first mount assembly and a second mount assembly, the first mount assembly connecting the first support wheel to a first end of the main beam, the second mount assembly connecting the second support wheel to a second end of the main beam; and a plurality of lifting means, each lifting means being provided between each mount assembly and the main beam, each lifting means comprising a screw rod and a corresponding nut that cooperate with each other to lift and lower the main beam relative to the support wheels. It enables long-distance and high-speed vehicle moving and makes operation more convenient.

14 Claims, 9 Drawing Sheets

(56) References Cited

U.S. PATENT DOCUMENTS

| | | | | | |
|---|---|---|---|---|---|
| 3,066,946 | A | * | 12/1962 | Nelson | B60P 3/127 |
| | | | | | 280/35 |
| 4,383,681 | A | * | 5/1983 | Walters | B66F 7/246 |
| | | | | | 269/69 |
| 4,471,971 | A | * | 9/1984 | Keesler | B60P 3/40 |
| | | | | | 280/47.131 |
| 4,784,402 | A | * | 11/1988 | Roman | B25H 5/00 |
| | | | | | 280/79.4 |
| 5,112,070 | A | * | 5/1992 | Hahn | B66F 5/02 |
| | | | | | 29/244 |
| D349,993 | S | * | 8/1994 | Brand | D34/12 |
| 5,547,206 | A | * | 8/1996 | Hodges | B25H 1/0007 |
| | | | | | 280/47.15 |
| 7,300,063 | B1 | * | 11/2007 | Prizmich | B62B 5/0083 |
| | | | | | 280/47.15 |
| 8,002,510 | B2 | * | 8/2011 | Williams | B62B 1/268 |
| | | | | | 414/490 |
| 8,657,305 | B1 | * | 2/2014 | Hassell | B60P 3/127 |
| | | | | | 280/43.21 |
| 8,910,957 | B1 | * | 12/2014 | Hassell | B60P 3/122 |
| | | | | | 254/108 |
| 11,554,802 | B2 | * | 1/2023 | Nooner | A63C 17/06 |
| 2016/0059913 | A1 | * | 3/2016 | Berger | B60P 3/127 |
| | | | | | 280/476.1 |
| 2017/0282776 | A1 | * | 10/2017 | Neveu | B60P 3/077 |

FOREIGN PATENT DOCUMENTS

| | | | |
|---|---|---|---|
| CN | 216833071 | U | 6/2022 |
| CN | 218085477 | U | 12/2022 |

* cited by examiner

VEHICLE DOLLY

RELATED APPLICATIONS

This application claims priority to Chinese Patent Application No. 202322492031.0, filed Sep. 13, 2023 and to Chinese Patent Application No. 202311183594.X, filed Sep. 13, 2023.

The above applications and all patents, patent applications, articles, books, specifications, other publications, documents, and things referenced herein are hereby incorporated herein in their entirety for all purposes. To the extent of any inconsistency or conflict in the definition or use of a term between any of the incorporated publications, documents, or things and the text of the present document, the definition or use of the term in the present document shall prevail.

TECHNICAL FIELD

The present disclosure pertains to the technical field of vehicle rescue devices, and relates to a vehicle dolly.

BACKGROUND

As society continues to evolve, automobiles have become an essential mode of transportation for daily travel. In the event of a vehicle breakdown or engine failure, a vehicle dolly is essential for safely moving the vehicle to a secure location or a repair shop for maintenance.

An existing vehicle dolly is disclosed in Chinese patent literature [Application No.: CN202021775915], in which a portable vehicle dolly with a ratchet mechanism comprises: a first support arm and a second support arm; cylindrical elements sleeved onto the first and second support arms respectively; left and right crossbeams connected to the first and second support arms respectively, the left crossbeam comprising a gear rack. When moving a vehicle, the vehicle dolly is pushed from the outside to surround a wheel, a user then repeatedly presses down on a pedal with his/her foot, so that the pedal actuates a first forked pawl of an active pawl to turn a gear that meshes with the gear rack located on an upper surface of the left crossbeam, causing the first and second support arms to move closer together and thus squeeze and lift the wheel; once the wheel is lifted to a safe height for moving the vehicle, the user can cease repeatedly pressing down on the pedal. Such portable vehicle dolly has the following shortcomings:

1. To ensure that the first and second support arms create an opening for a wheel to be surrounded, their ends far from the left crossbeam cannot be connected. Thus, the length of these support arms must be limited to maintain their strength and parallel alignment. Consequently, a single such vehicle dolly can only lift one wheel, necessitating the use of two dollies to lift the left and right wheels of a vehicle individually, leading to relatively long operation time and inconvenience.

2. Due to the requirement for swivel castors of such vehicle dolly to fit under a vehicle chassis, the swivel castors cannot be large in size. Consequently, such vehicle dolly is only suitable for short-distance, slow-speed vehicle moving operations.

SUMMARY

Some objectives of one embodiment of the present disclosure are to provide a vehicle dolly that addresses the aforementioned issues in the prior art, such as inconvenience in using and difficulty in achieving high-speed vehicle moving.

The objective of the present disclosure can be achieved by the following technical solution. One embodiment of a vehicle dolly comprises two parallel lifting axle assemblies and two wheel assemblies, with the two lifting axle assemblies being positioned between the two wheel assemblies, two ends of each of the lifting axle assemblies being detachably connected to the two wheel assemblies, each of the wheel assemblies comprising: a main beam perpendicular to the two lifting axle assemblies; a first support wheel and a second support wheel; a first mount assembly and a second mount assembly, the first mount assembly connecting the first support wheel to a first end of the main beam, the second mount assembly connecting the second support wheel to a second end of the main beam; and a plurality of lifting means, each lifting means being provided between each mount assembly and the main beam, each lifting means comprising a screw rod and a corresponding nut that cooperate with each other to lift and lower the main beam relative to the support wheels.

In the above vehicle dolly of the present disclosure, the two main beams are provided and the two ends of each lifting axle assembly are detachably connected to the two wheel assemblies (specifically, to the two main beams in the two wheel assemblies), which is that the ends on each side of the two lifting axle assemblies are connected together by the two main beams respectively, so that the two lifting axle assemblies are capable of providing sufficient support strength and having a significant length. When using this vehicle dolly, a user places the two wheel assemblies, with support wheels mounted, adjacent to the outside of the left and right wheels; then the user places the two lifting axle assemblies under a chassis of a vehicle and aligned with front and rear sides of left and right wheels of the vehicle, and connects the two lifting axle assemblies to the two wheel assemblies; and then the user adjusts the height of the two lifting axle assemblies through the lifting means to ensure the two lifting axle assemblies abut against the front and rear sides of the left and right wheels; by further raising the two lifting axle assemblies through the lifting means, the left and right wheels can lifted off the ground. Obviously, the above vehicle dolly of the present disclosure can lift both left and right wheels of a vehicle simultaneously, offering enhanced convenience, reducing complexity of operation, and greatly shortening the time for vehicle towing and rescue.

Furthermore, in use of the above vehicle dolly, the support wheels are positioned adjacent to the outside of vehicle wheels to be towed, rather than directly under a vehicle chassis. This allows for use of larger-sized support wheels, which in turn enables long-distance and high-speed vehicle moving.

In one embodiment of the above vehicle dolly, each screw rod is vertically disposed and fixedly connected to each mount assembly and capable of passing through the corresponding nut, each mount assembly comprises a vertically disposed guide plate and a wheel spindle connected to a side wall of the guide plate facing away from the main beam, each support wheel is rotatably connected to one of the wheel spindles, and each nut is axially fixed and positioned within the main beam and capable of circumferential rotation. In use of the above vehicle dolly, each mount assembly is connected to its respective support wheel and thus stays fixed relative to the ground, meanwhile each screw rod is fixedly connected to each mount assembly and thus also stays fixed relative to the ground and cannot move up and down; consequently, as each nut rotates, it moves along the corresponding screw rod up and down, bringing the related main beam and lifting axle assembly to ascend or descend relative to the ground, thereby lifting or lowering vehicle wheels. The design of connecting the wheel spindle to the guide plate's side wall facing away from the main beam, not only facilitates the attachment of the support wheel to each mount assembly but also ensures the support wheel's stability.

In one embodiment of the above vehicle dolly, a driving shaft is provided inside the main beam in the same direction as a length direction of the main beam, with two ends of the driving shaft each having a helical-tooth segment, the two ends of the main beam each having one of the nuts, each nut having a worm-gear tooth on an outer circumferential wall of the nut, the worm-gear tooth on the nut provided at the first end of the main beam engages with the helical-tooth segment provided at a first end of the driving shaft, and the worm-gear tooth on the nut provided at the second end of the main beam engages with the helical-tooth segment provided at a second end of the driving shaft. In use of the above vehicle dolly, the driving shaft is rotated by an electric wrench, the rotation of the driving shaft drives the nuts at both ends of the corresponding main beam to rotate synchronously, causing the both ends of that main beam to ascend or descend relative to the ground synchronously, which drives the lifting axle assembly connected to that main beam to also ascend or descend, thereby ultimately lifting or lowering vehicle wheels.

In one embodiment of the above-mentioned vehicle dolly, an upper mounting hole is provided at a top surface of each end of the main beam, a lower mounting hole is provided at a bottom surface of each end of the main beam, an upper limit sleeve is provided within the upper mounting hole and fixedly connected to the main beam, with a lower end of the upper limit sleeve extending into the main beam, and an upper end of each nut is plugged into a corresponding upper limit sleeve, while a lower end of each nut is plugged into a corresponding lower mounting hole. This design allows each nut to rotate stably while fixing its axial position. Furthermore, because a lower end of the upper limit sleeve extends into the main beam and an upper end of each nut is plugged into a corresponding upper limit sleeve, each nut can be shortened adequately to fit inside the main beam. Thus, specifically, an installation process for each nut is as follows: first, place the nut inside the main beam, and plug the lower end of the nut into the corresponding lower mounting hole; next, insert the upper limit sleeve into the corresponding upper mounting hole, and plug the upper end of the nut into the upper limit sleeve; finally, secure the upper limit sleeve to complete the nut installation inside the main beam. This method of nut installation is highly convenient.

In one embodiment of the above vehicle dolly, an upper end of each upper limit sleeve has a flange, the flange being positioned outside the main beam, abutting against the top surface of each end of the main beam, and being connected to the main beam by bolts. This design facilitates installation of the upper limit sleeve and ensures its stability.

In one embodiment of the above vehicle dolly, a snap-fit tab is connected to each end of each lifting axle assembly, a snap-fit socket is connected to each end of the main beam, and each snap-fit tab at each end of each lifting axle assembly is capable of snap-fitting with a corresponding snap-fit socket, enabling the snap-fit socket to securely retain and support a corresponding snap-fit tab. This structure facilitates the detachable connection of the lifting axle assembly to the main beam. Once the lifting axle assembly is connected to the main beam, the snap-fit socket supports the snap-fit tab, enabling the main beam to drive the lifting axle assembly to ascend or descend in sync, thereby lifting or lowering the vehicle wheels.

In one embodiment of the above vehicle dolly, the main beam is a hollow beam with a rectangular cross-section, each of the support wheels is positioned on an outer side of the main beam, with an outer side wall of the main beam facing the support wheels, and each of the guide plates is positioned parallel to the outer side wall of the main beam and abuts against it. The hollow main beam reduces its weight, providing the vehicle dolly with the advantage of being lightweight. When the guide plate abuts against the outer side wall of the main beam, it prevents rotation of the corresponding screw rod. Therefore, as each nut is rotated to lift or lower the main beam, the corresponding screw rod and guide plate stay fixed relative to the ground and will not rotate with the nut, preventing misalignment of the support wheels, that is, ensuring that all four support wheels of the vehicle dolly always maintain a consistent forward direction: the front two support wheels are coaxial, the rear two support wheels are coaxial, and the axes of the front and rear support wheels are parallel. This configuration allows the vehicle dolly to travel at high speeds and ensures stability during high-speed travel. It should be noted that, "high-speed travel", as used herein, does not specifically refer to highway speeds, but rather refers to relatively faster travel speeds. The main beam's rectangular cross-section, combined with each guide plate positioned parallel to and abutting against the outer side wall of the main beam, creates a significant contact area between the guide plate and the main beam. This significant contact area enhances the guide plate's guiding effect on the ascending and descending movement of the main beam, allowing the main beam to ascend and descend stably, thereby enhancing operational stability of the vehicle dolly.

In one embodiment of the above vehicle dolly, an upper end of the guide plate has a mounting portion positioned on an upper side of the main beam, and an upper end of the screw rod is fixedly connected to the mounting portion. The positioning of each guide plate's mounting portion on the upper side of the main beam facilitates and ensures accurate installation of the screw rod, which in turn enhances mating accuracy between the screw rod and the corresponding nut, ultimately enabling stable ascension and descension of the main beam of the vehicle dolly.

Compared to the prior art, the present disclosure has the following advantages:

1. In use of the vehicle dolly of the present disclosure, the support wheels are positioned adjacent to the outside of vehicle wheels to be towed, rather than directly under a vehicle chassis. This allows for use of larger-sized support wheels, which in turn enables long-distance and high-speed vehicle moving.

2. In the vehicle dolly of the present disclosure, each screw rod can be disconnected from the main beam, enabling the support wheels to be shifted towards the center of the main beam when the vehicle dolly is not in use, thereby reducing a distance between the two support wheels in each wheel assembly, leading to a more compact storage size of each wheel assembly of the vehicle dolly, and also reducing a storage size of the vehicle dolly.

3. By setting up the lifting means between each end of the main beam and the mount assembly, the main beam can ascend and descend relative to the support wheels through cooperation of the screw rod and nut. Therefore, the vehicle dolly of the present disclosure eliminates the need for a jack to lift a vehicle and its wheels off the ground, making operation more convenient and labor-saving, thereby reducing operation complexity and greatly shortening the time for vehicle towing and rescue.

4. The vehicle dolly of the present disclosure also achieves lightweight construction, making it advantageous for easy maneuverability and user-friendliness.

DETAILED DESCRIPTION

Set forth below are specific embodiments of the present disclosure and a further description of the technical solutions of the present disclosure in conjunction with the accompanying drawings, but the present disclosure is not limited to these embodiments.

Figure 1:
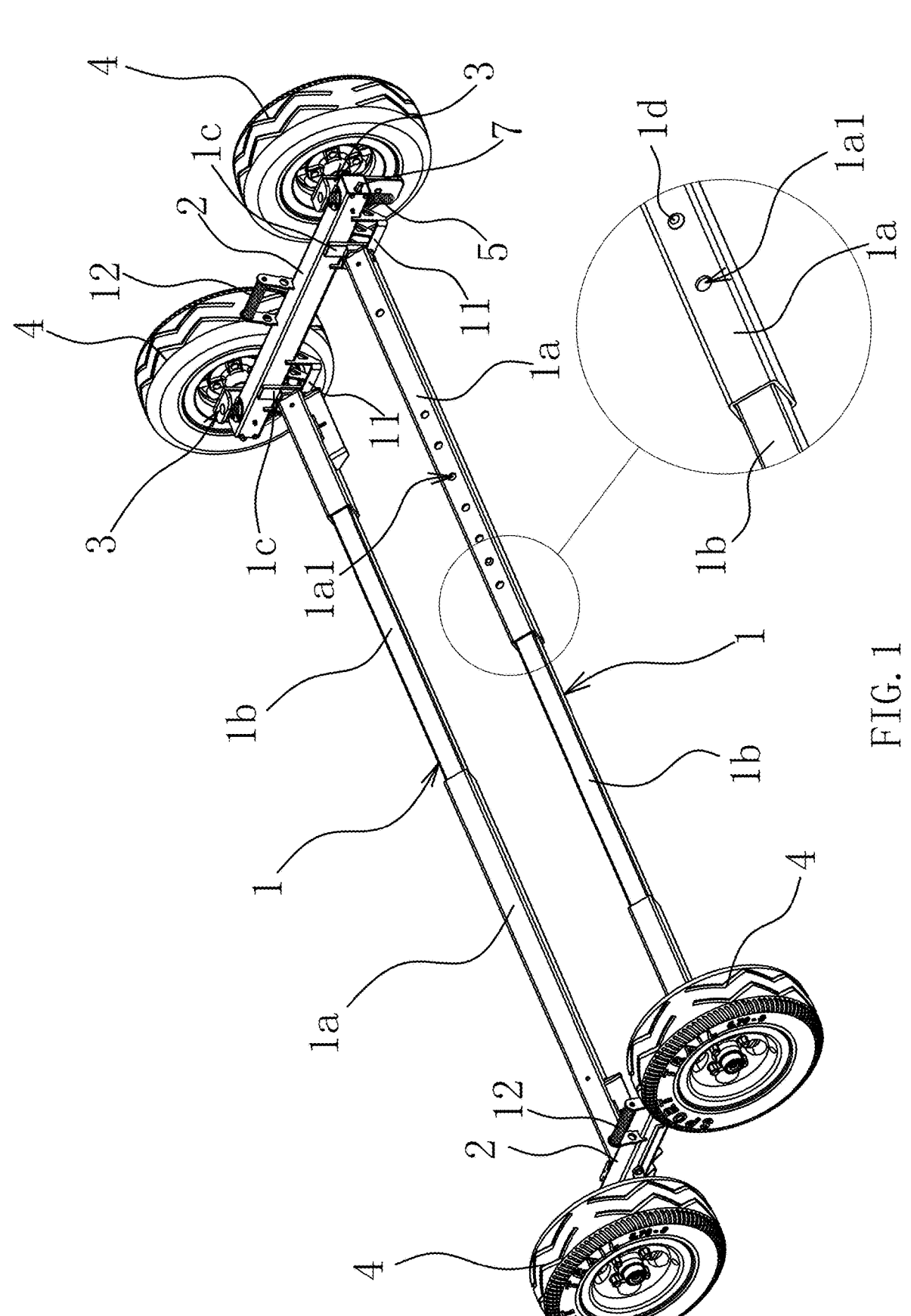
FIG. 1 is a perspective view of a vehicle dolly of the present disclosure.
Figure 2:
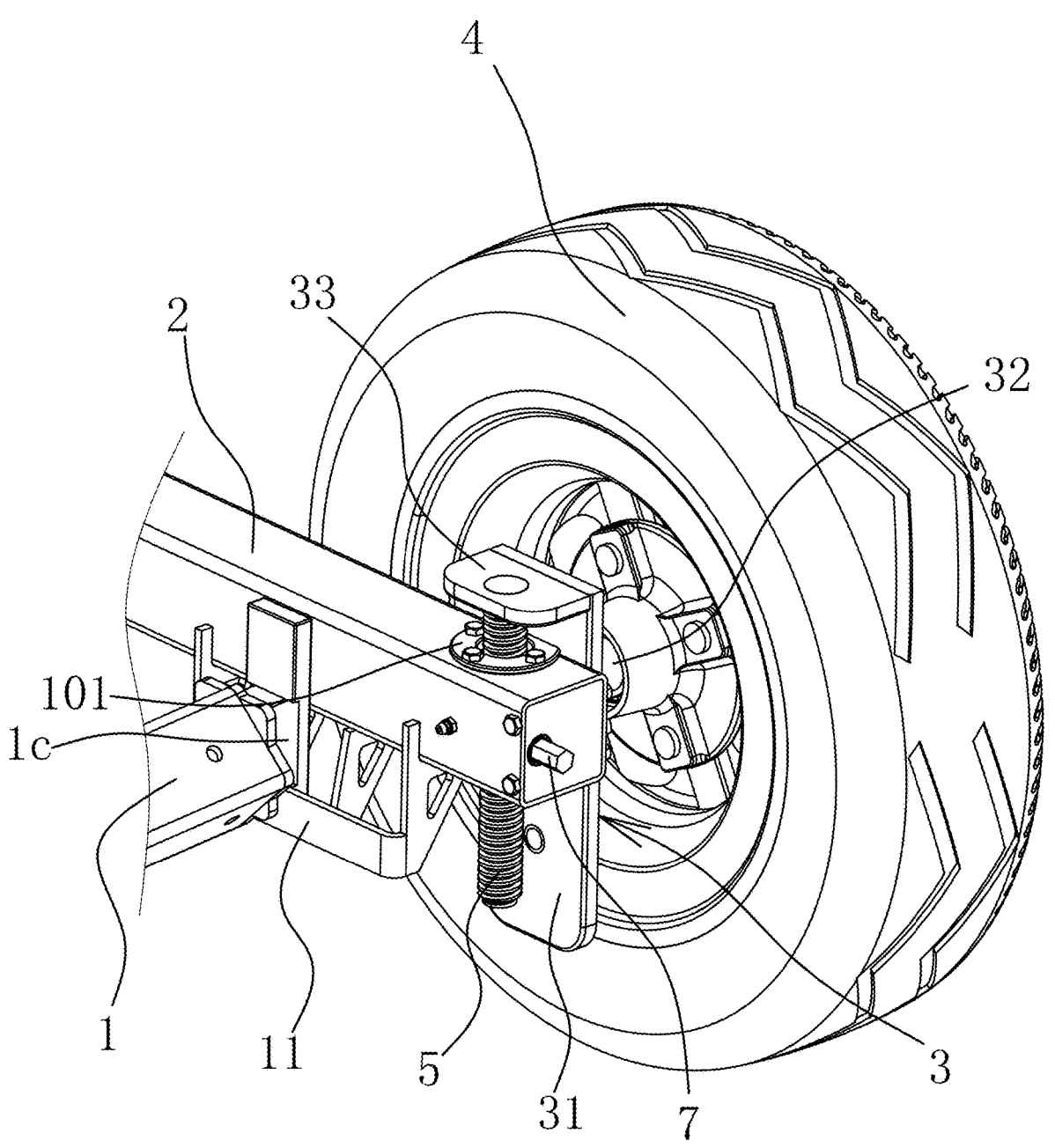
FIG. 2 is an enlarged view of a support wheel and its surrounding structures of the vehicle dolly depicted in FIG. 1.

As shown in FIGS. 1 and 2, embodiments of a vehicle dolly of the present disclosure comprises two parallel lifting axle assemblies 1 and two wheel assemblies, with the two lifting axle assemblies 1 being positioned between the two wheel assemblies, two ends of each of the lifting axle assemblies 1 being detachably connected to the two wheel assemblies, each of the wheel assemblies comprising: a main beam 2 perpendicular to the two lifting axle assemblies 1; a first support wheel 4 and a second support wheel 4; a first mount assembly 3 and a second mount assembly 3, the first mount assembly 3 connecting the first support wheel 4 to a first end of the main beam 2, the second mount assembly 3 connecting the second support wheel 4 to a second end of the main beam 2; and a plurality of lifting means, each lifting means being provided between each mount assembly 3 and the main beam 2, each lifting means comprising a screw rod 5 and a corresponding nut 6 that cooperate with each other to lift and lower the main beam 2 relative to the support wheels 4. Each lifting means utilizes a kinematic pair consisting of the screw rod 5 and the nut 6 to enable convenient height adjustment of the main beam 2, while establishing a stable connection between each mount assembly 3 and the main beam 2. Each lifting axle assembly 1 comprises: an outer axle tube 1*a*, and a telescopic axle tube 1*b* provided within the outer axle tube 1*a*, wherein a plurality of locking holes 1*a*1 provided in a sequential manner on the outer axle tube 1*a* along a length direction of the outer axle tube 1*a*, and a spring pin 1*d* provided on the telescopic axle tube 1*b*; and wherein by adjusting a length of the telescopic axle tube 1*b* extending out of the outer axle tube 1*a*, the spring pin 1*d* is capable of engaging with any of the locking holes 1*a*1. This design allows for adjusting a length of the lifting axle assembly 1, enabling the vehicle dolly to accommodate vehicles of various widths, thereby enhancing its versatility and practicality.

Figure 3:
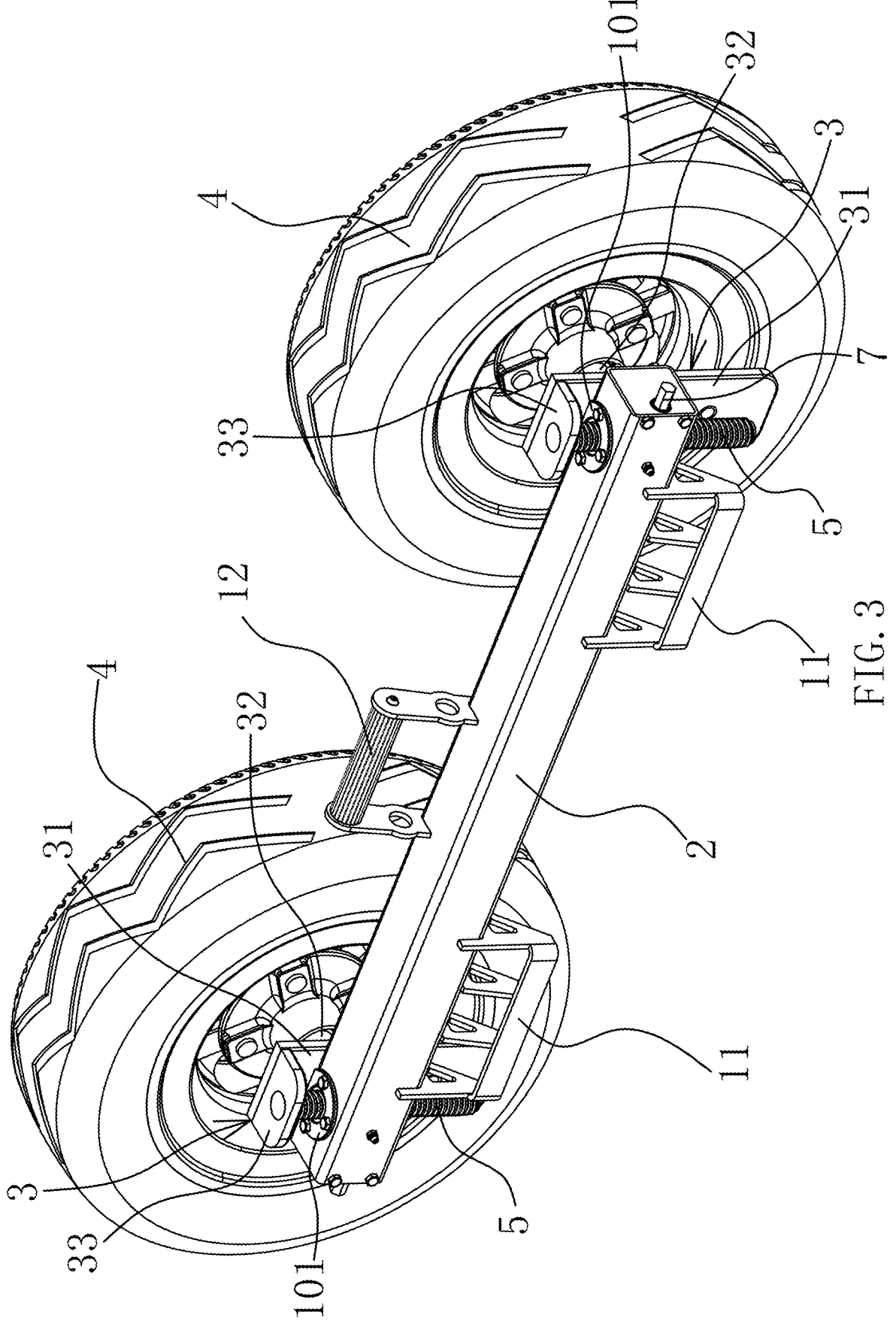
FIG. 3 is a perspective view of a main beam connected with two support wheels.

As shown in FIGS. 2 and 3, the main beam 2 is a hollow beam with a rectangular cross-section, each of the support wheels 4 is positioned on an outer side of the main beam 2, with an outer side wall 2*a* of the main beam 2 facing the support wheels 4. A snap-fit tab 1*c* is connected to each end of each lifting axle assembly 1, a snap-fit socket 11 is fixedly connected to each end of the main beam 2, and each snap-fit tab 1*c* at each end of each lifting axle assembly 1 is capable of snap-fitting with a corresponding snap-fit socket 11, enabling the snap-fit socket 11 to securely retain and support a corresponding snap-fit tab 1*c*.

As shown in FIGS. 2 to 5, each screw rod 5 is vertically disposed and fixedly connected to each mount assembly 3 and capable of passing through the corresponding nut 6, each mount assembly 3 comprises a vertically disposed guide plate 31 and a wheel spindle 32 connected to a side wall of the guide plate 31 facing away from the main beam 2, and each of the guide plates 31 is positioned parallel to the outer side wall 2*a* of the main beam 2 and abuts against it. Each support wheel 4 is rotatably connected to one of the wheel spindles 32, and each nut 6 is axially fixed and positioned within the main beam 2 and capable of circumferential rotation. Specifically, an upper end of the guide plate 31 has a mounting portion 33 positioned on an upper side of the main beam 2, and an upper end of the screw rod 5 is fixedly connected to the mounting portion 33. The term "vertically", as used herein, encompasses not only an absolute vertical state, which is defined as a 90-degree angle with a horizontal plane, but also allows for a slight deviation in orientation of approximately 3 degrees from the absolute vertical state. A lower end of each guide plate 31 is lower than a lower end of the corresponding screw rod 5; therefore, even if the main beam 2 descends to the point where the screw rod 6 becomes disconnect from the main beam 2 and the nut 6, the lower end of the guide plate 31 can still abut against the outer side wall 2*a* of the main beam 2, thereby enhancing stability in the process of shifting the support wheels 4 inward or outward.

Figure 6:
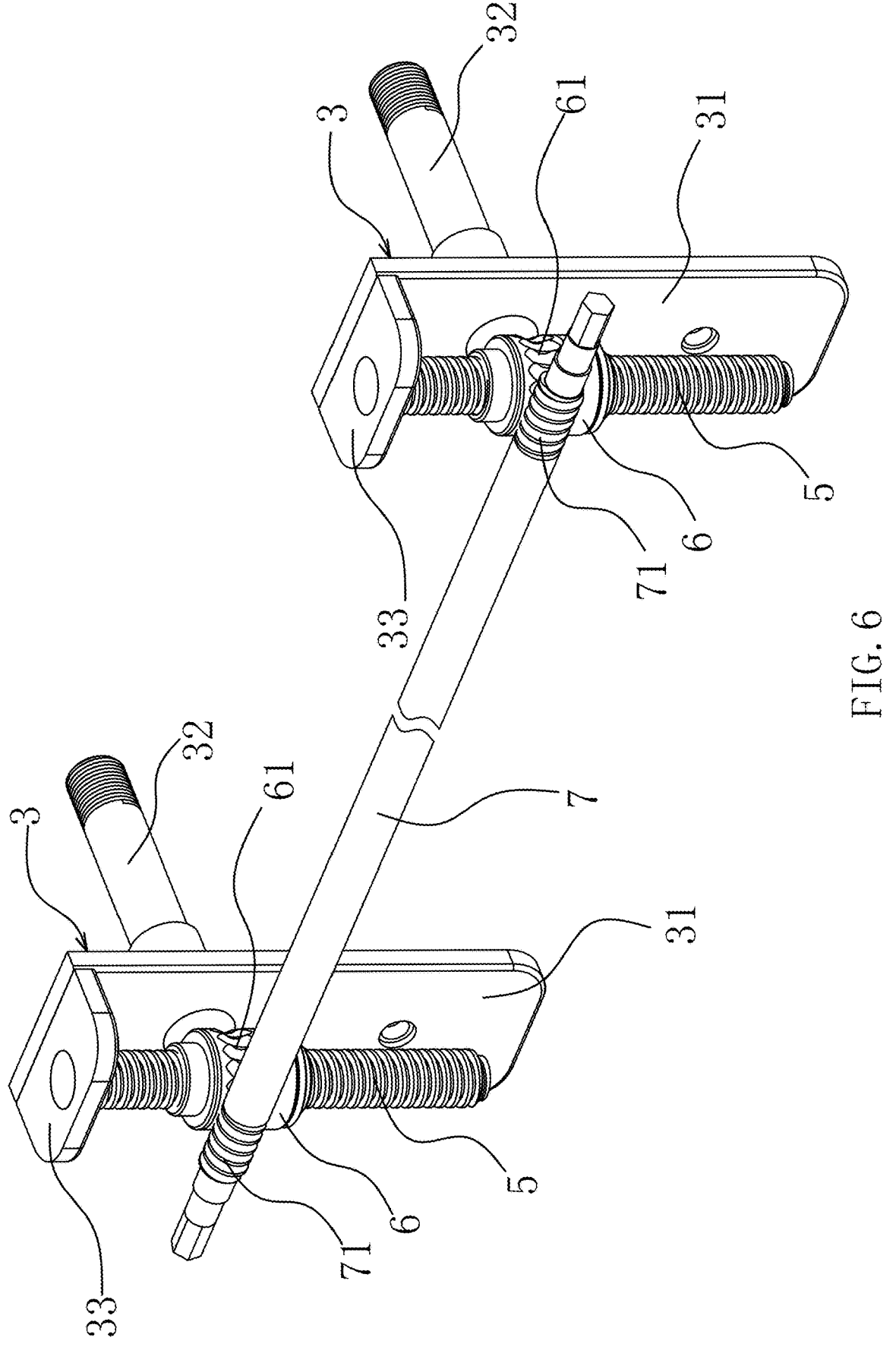
FIG. 6 is a perspective view of a lifting means.

As shown in FIG. 6, a driving shaft 7 is provided inside the main beam 2 in the same direction as a length direction of the main beam 2, with two ends of the driving shaft 7 each having a helical-tooth segment 71, the two ends of the main beam 2 each having one of the nuts 6, each nut 6 having a worm-gear tooth 61 on an outer circumferential wall of the nut 6, the worm-gear tooth 61 on the nut 6 provided at the first end of the main beam 2 engages with the helical-tooth segment 71 provided at a first end of the driving shaft 7, and the worm-gear tooth 61 on the nut 6 provided at the second end of the main beam 2 engages with the helical-tooth segment 71 provided at a second end of the driving shaft 7. The two ends of the driving shaft 7 extend out of two corresponding end faces of the main beam 2, with each protruding portion of the driving shaft 7 from either end face of the main beam 2 having a hexagonal cross-section. This facilitates connection of an electric wrench to drive rotation of the driving shaft 7. Of course, in situations where an electric wrench is not accessible, a regular wrench can be used to manually rotate the driving shaft 7.

Figure 5:
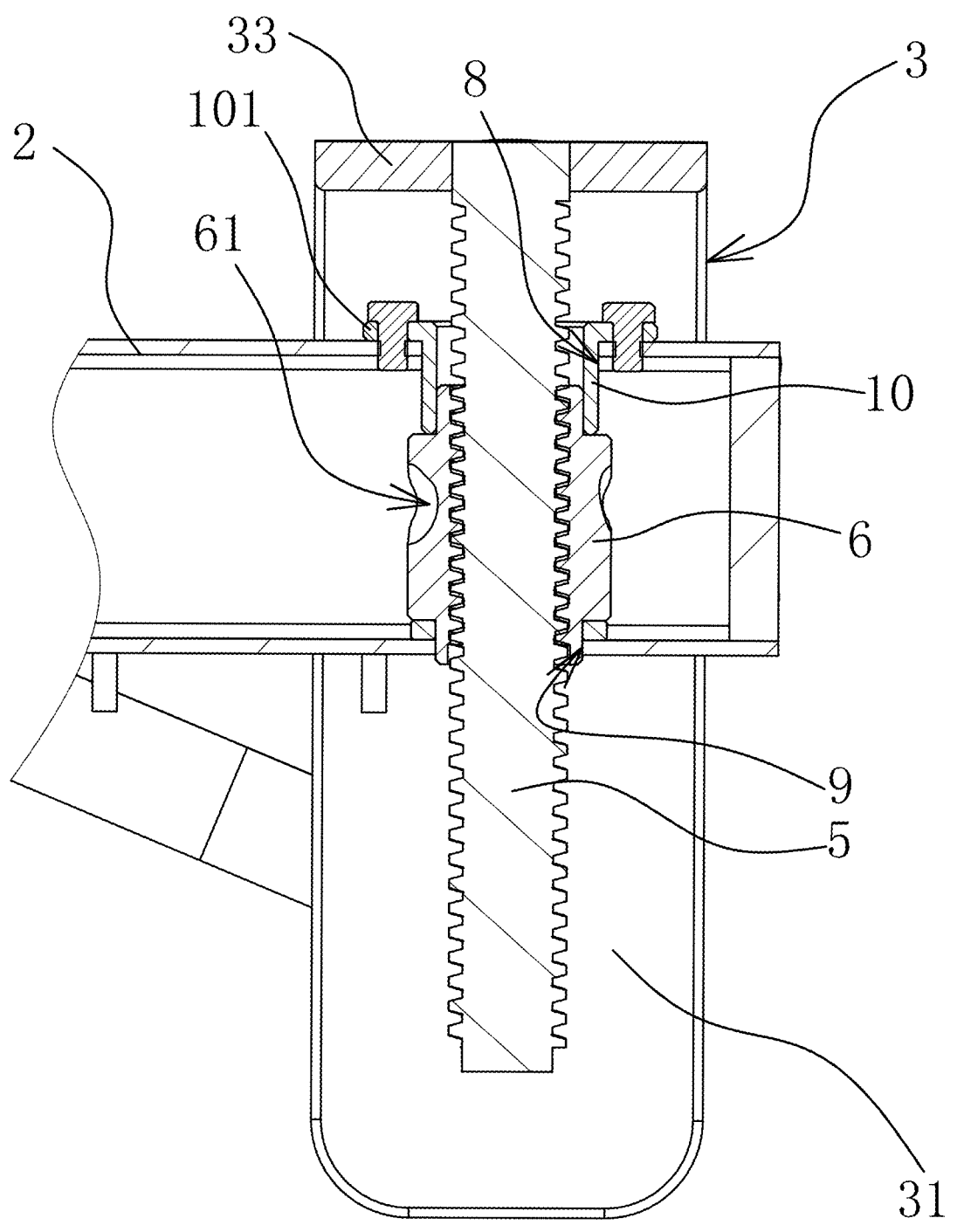
FIG. 5 is a cross-sectional view of an end area of the main beam.

As shown in FIG. 5, an upper mounting hole 8 is provided at a top surface of each end of the main beam 2, a lower mounting hole 9 is provided at a bottom surface of each end of the main beam 2, an upper limit sleeve 10 is provided within the upper mounting hole 8 and fixedly connected to the main beam 2, with a lower end of the upper limit sleeve 10 extending into the main beam 2, and an upper end of each nut 6 is plugged into a corresponding upper limit sleeve 10, while a lower end of each nut 6 is plugged into a corresponding lower mounting hole 9. An upper end of each upper limit sleeve 10 has a flange 101, the flange 101 being positioned outside the main beam 2, abutting against the top surface of each end of the main beam 2, and being connected to the main beam 2 by bolts. Thus, an installation process for each nut 6 is as follows: first, place the nut 6 inside the main beam 2, and plug the lower end of the nut 6 into the corresponding lower mounting hole 9; next, insert the upper limit sleeve 10 into the corresponding upper mounting hole 8, and plug the upper end of the nut 6 into the upper limit sleeve 10; finally, secure the upper limit sleeve 10 to complete the nut 6 installation inside the main beam 2. This method of nut 6 installation is highly convenient.

Figure 4:
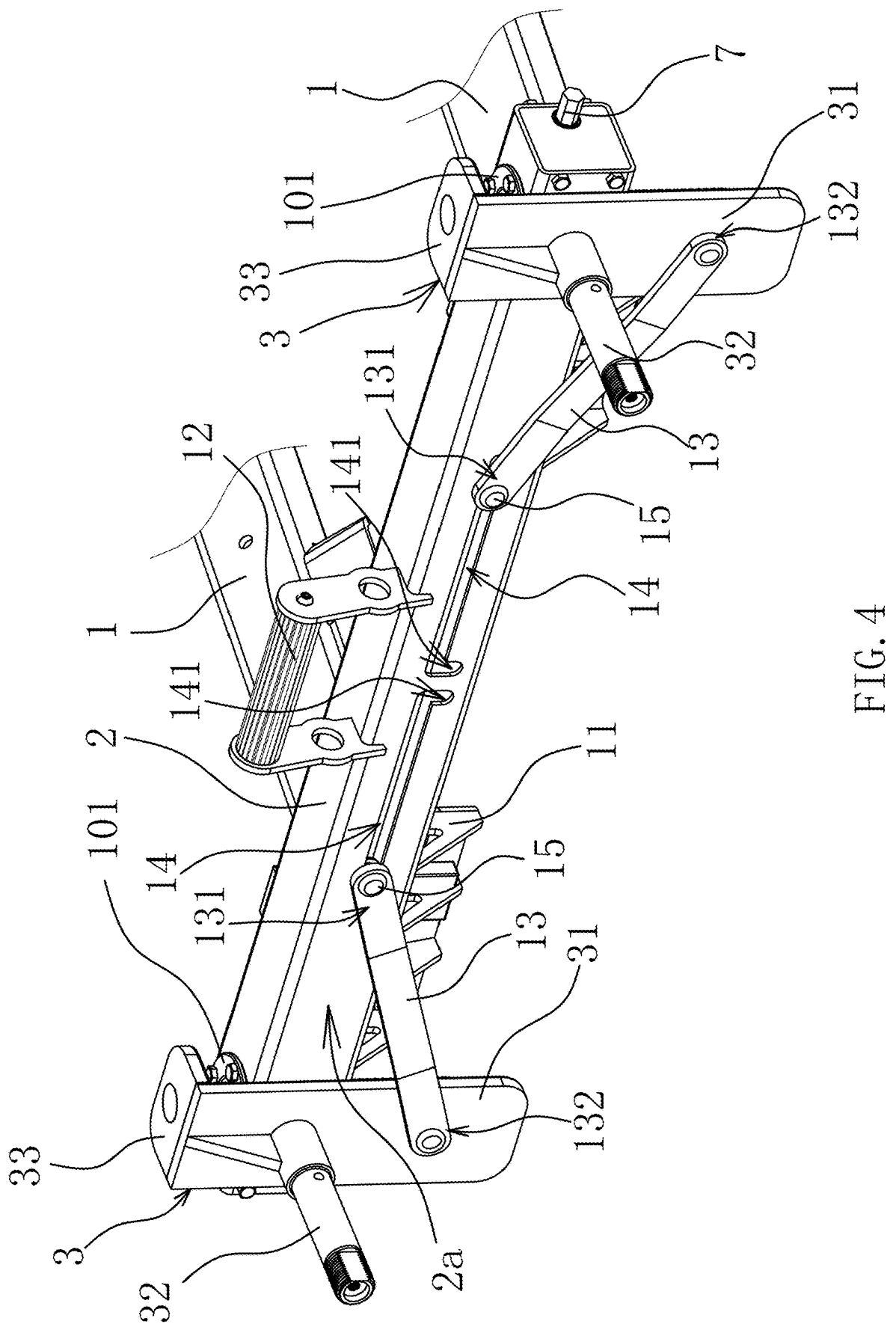
FIG. 4 is a partial perspective view of the main beam from FIG. 1, without the support wheels.
Figure 7:
FIG. 7 is a front view of a mount assembly screw rod disconnected from the main beam.
Figure 8:
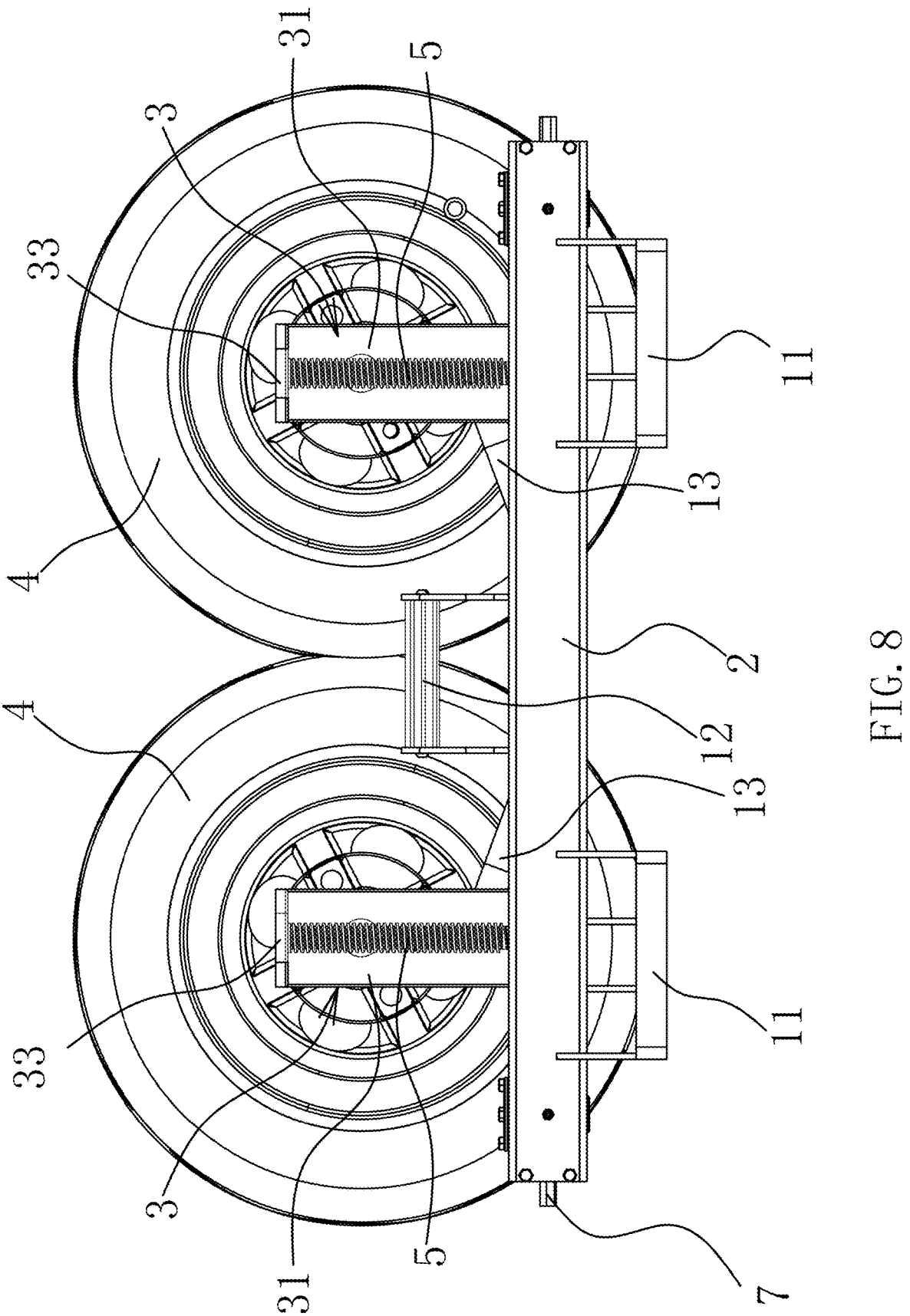
FIG. 8 is a front view of a wheel assembly with the mount assemblies and the support wheels shifted inward for retraction.

As shown in FIGS. 4, 7, and 8, each mount assembly 3 is movably connected to the main beam 2 through a link arm 13, and each screw rod 5 and the corresponding nut 6 are detachable from each other, and, once detached, allow a corresponding mount assembly 3 to be moved in a direction towards a middle of the main beam 2. This allows each support wheel 4 to be shifted inward for retraction, thereby reducing a storage size of the vehicle dolly. Furthermore, thanks to the design where each mount assembly 3 is movably connected to the main beam 2 through a link arm 13, each support wheel 4 stays connected to the main beam 2 via the link arm 13, even if each screw rod 5 and its corresponding nut 6 disconnect from each other; therefore, during an inward or outward shifting process of the support wheel 4 for retraction or expansion, the support wheel 4 still can maintain balance and stability, reducing the risk of tipping over or deviating from the main beam, thereby ensuring smooth and convenient retracting and expanding processes of the support wheel 4; in addition, the design allows for effortless alignment of the screw rod 5 with the corresponding nut 6 when the support wheel 4 is expanded outward to prepare the vehicle dolly for use, enabling the screw rod 5 to swiftly pass through the corresponding nut 6, thereby facilitating an operation of lifting a vehicle using the vehicle dolly.

As shown in FIG. 4, each link arm 13 has a first end that is a sliding end 131, which is slidably connected to the main beam 2 along a length direction of the main beam 2, and each link arm 13 has a second end that is a hinged end 132, which is hinged to the corresponding mount assembly 3, enabling the sliding end 131 of each link arm 13 to pivot up and down relative to the hinged end 132. A tip portion of the sliding end 131 of the link arm 13 is parallel to and abuts against the outer side wall 2a of the main beam 2, meanwhile, a tip portion of the hinged end 132 of the link arm 13 is parallel to and abuts against the side wall of the guide plate 31 facing away from the main beam 2. Because the sliding end 131 of the link arm 13 is slidably connected to the main beam 2 along the length direction of the main beam 2, each support wheel 4 can smoothly slide towards the middle of the main beam 2 after the related screw rod 5 and the corresponding nut 6 disconnect from each other, thereby achieving a smooth retraction of the support wheel 4. As shown in FIG. 4, a first elongated slot 14 and a second elongated slot 14 are provided on the outer side wall 2a of the main beam 2, with a length direction of each of the elongated slots 14 being consistent with the length direction of the main beam 2, and the sliding end 131 of each link arm 13 is slidably connected to one of the elongated slots 14 through a slider 15. One end of each of the elongated slots 14 is positioned in the middle of the main beam 2 and has a positioning notch 141 for insertion of the slider 15. By inserting the slider 15 into the positioning notch 141, the support wheel 4 can remain retracted after shifting inward and will not expand outward automatically.

The following describes a method for operating the vehicle dolly:

Before use, the main beam 2 and the support wheels 4 are already connected, while the two lifting axle assemblies 1 are not yet installed on the main beam 2. When in use, a user first connects each screw rod 5 on the guide plate 31 to the corresponding nut 6 on the main beam 2, and then positions the two main beams 2 with the mounted support wheels 4 adjacent to the outer sides of left and right wheels to be lifted of a vehicle, respectively.

Next, the two lifting axle assemblies 1 are individually attached to the two main beams 2, and positioned under a chassis of the vehicle and aligned with front and rear sides of the left and right wheels to be lifted, with a distance between the two lifting axle assemblies 1 smaller than an outer diameter of the wheels. At this stage, the two lifting axle assemblies 1 are connected to the left and right main beams 2, forming a "pallet state".

Figure 9:
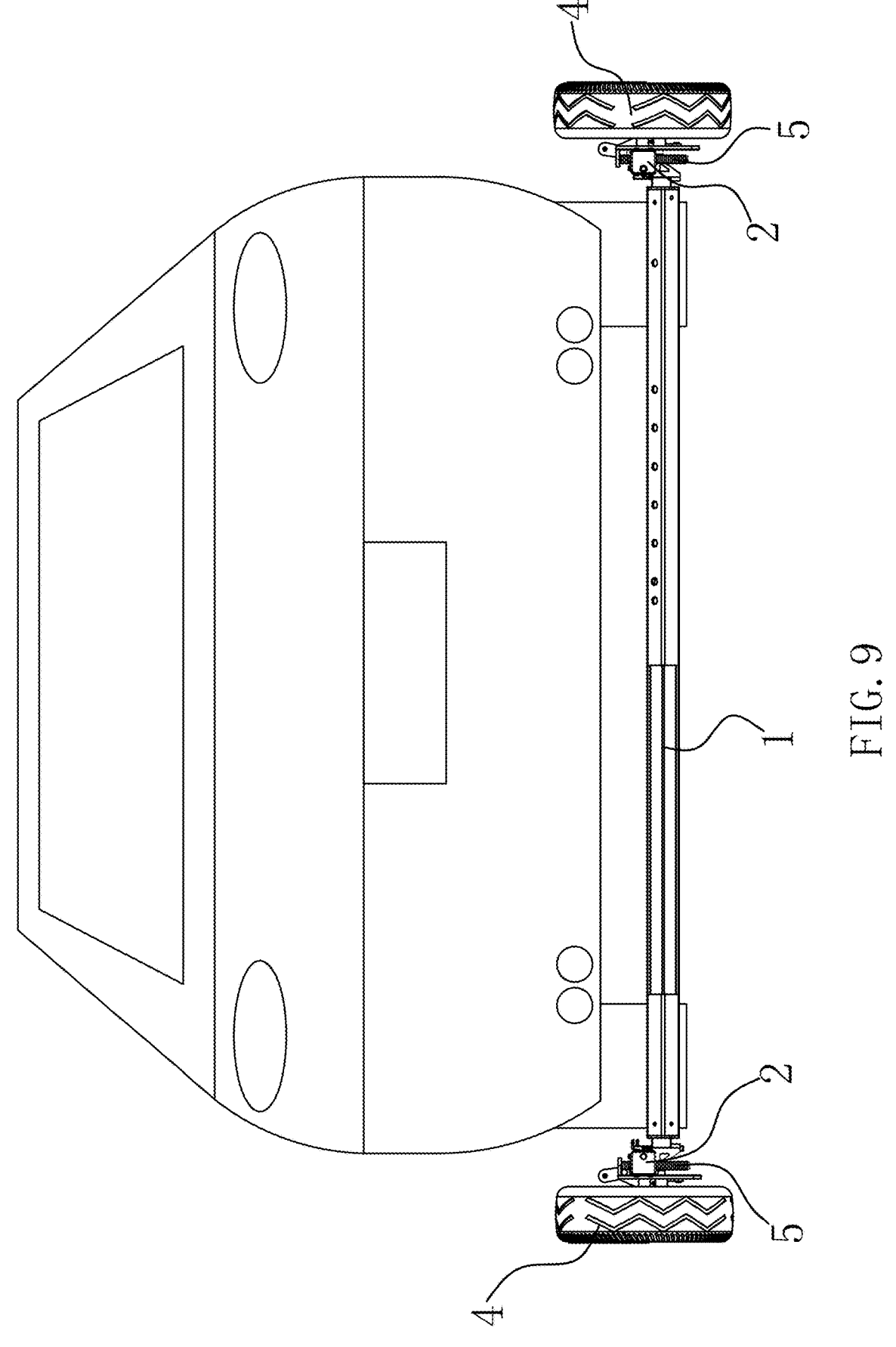
FIG. 9 is a rear view of a vehicle being lifted by the vehicle dolly of the present disclosure.

Then, by rotating the driving shaft 7 with an electric wrench or a regular wrench, the main beams 2 and the lifting axle assemblies 1 are driven to ascend simultaneously, lifting the vehicle wheels off the ground, forming a state as shown in FIG. 9, where the vehicle dolly is configured as shown in FIG. 1. Once the vehicle wheels are lifted, the four support wheels 4 of the vehicle dolly assume both supporting and driving functions, enabling the towing and rescue of a faulty vehicle.

After the faulty vehicle is towed to a designated location, the lifting axle assemblies 1 are driven to descend by reversing rotation of the driving shaft 7 using an electric wrench or a regular wrench, until the vehicle wheels are fully in contact with the ground. Subsequently, the two lifting axle assemblies 1 can be removed.

To reduce the storage size of the vehicle dolly, the support wheels 4 on each main beam 2 can be retracted inward. Specifically, a retracting operation is as follows: Rotate the driving shaft 7 to drive the main beam 2 to descend until the screw rod 5 disconnects from the main beam 2, forming a state as shown in FIG. 7. At this point, the two support wheels 4 on the main beam 2 can be shifted towards the middle of the main beam 2, forming a state as shown in FIG. 8, thereby reducing the distance between the two support wheels 4 and leading to a more compact storage size of the vehicle dolly. Each main beam 2 has a handle 12 for easy carrying the main beam 2 and the support wheels 4 are mounted on the main beam 2. Conversely, to prepare the vehicle dolly for use, simply shift the support wheels 4 outward and re-connect each screw rod 5 to the corresponding nut 6. Both the retracting and expanding operations of the support wheels 4 and connecting and disassembling the nuts 6 and the screw rods 5 are highly convenient.

The specific embodiments described herein are merely illustrative of the spirit of the present disclosure. A person skilled in the art to which the present disclosure pertains can make various modifications, additions, or similar substitutions to the specific embodiments described, without departing from the spirit and scope of the present disclosure defined by the appended claims.

REFERENCED PARTS

1 Lifting axle assembly
1a Outer axle tube
1a1 Locking hole
1b Telescopic axle tube
1c Snap-fit tab
1d Spring pin
2 Main beam
2a Outer side wall
3 Mount assembly
31 Guide plate
32 Wheel spindle
33 Mounting portion
4 Support wheel
5 Screw rod
6 Nut
61 Worm-gear tooth
7 Driving shaft
71 Helical-tooth segment
8 Upper mounting hole
9 Lower mounting hole
10 Upper limit sleeve
101 Flange
11 Snap-fit socket
12 Handle
13 Link arm
131 Sliding end
132 Hinged end
14 Elongated slot
141 Positioning notch
15 Slider

The invention claimed is:

1. A vehicle dolly, comprising:
two parallel lifting axle assemblies; and
two wheel assemblies, with the two lifting axle assemblies being positioned between the two wheel assemblies, two ends of each of the lifting axle assemblies being detachably connected to the two wheel assemblies, each of the wheel assemblies comprising:
   a main beam perpendicular to the two lifting axle assemblies;
   a first support wheel and a second support wheel;
   a first mount assembly and a second mount assembly, the first mount assembly connecting the first support wheel to a first end of the main beam, the second mount assembly connecting the second support wheel to a second end of the main beam; and
   a plurality of lifting means, each lifting means being provided between each mount assembly and the main beam, each lifting means comprising a screw rod and a corresponding nut that cooperate with each other to lift and lower the main beam relative to the support wheels.

2. The vehicle dolly as claimed in claim 1, wherein each screw rod is vertically disposed and fixedly connected to each mount assembly and capable of passing through the corresponding nut,
each mount assembly comprises a vertically disposed guide plate and a wheel spindle connected to a side wall of the guide plate facing away from the main beam,
each support wheel is rotatably connected to one of the wheel spindles, and each nut is axially fixed and positioned within the main beam and capable of circumferential rotation.

3. The vehicle dolly as claimed in claim 2, wherein
a driving shaft is provided inside the main beam in the same direction as a length direction of the main beam, with two ends of the driving shaft each having a helical-tooth segment,
the two ends of the main beam each having one of the nuts, each nut having a worm-gear tooth on an outer circumferential wall of the nut,
the worm-gear tooth on the nut provided at the first end of the main beam engages with the helical-tooth segment provided at a first end of the driving shaft, and
the worm-gear tooth on the nut provided at the second end of the main beam engages with the helical-tooth segment provided at a second end of the driving shaft.

4. The vehicle dolly as claimed in claim 3, wherein
the two ends of the driving shaft extend out of two corresponding end faces of the main beam, with each protruding portion of the driving shaft from either end face of the main beam having a hexagonal cross-section.

5. The vehicle dolly as claimed in claim 2, wherein
an upper mounting hole is provided at a top surface of each end of the main beam,
a lower mounting hole is provided at a bottom surface of each end of the main beam,
an upper limit sleeve is provided within the upper mounting hole and fixedly connected to the main beam, with a lower end of the upper limit sleeve extending into the main beam, and
an upper end of each nut is plugged into a corresponding upper limit sleeve, while a lower end of each nut is plugged into a corresponding lower mounting hole.

6. The vehicle dolly as claimed in claim 5, wherein
an upper end of each upper limit sleeve has a flange, the flange being positioned outside the main beam, abutting against the top surface of each end of the main beam, and being connected to the main beam by bolts.

7. The vehicle dolly as claimed in claim 1, wherein
a snap-fit tab is connected to each end of each lifting axle assembly,
a snap-fit socket is connected to each end of the main beam, and
each snap-fit tab at each end of each lifting axle assembly is capable of snap-fitting with a corresponding snap-fit socket, enabling the snap-fit socket to securely retain and support a corresponding snap-fit tab.

8. The vehicle dolly as claimed in claim 1, wherein
each lifting axle assembly comprises:
an outer axle tube, and
a telescopic axle tube provided within the outer axle tube,
wherein a plurality of locking holes provided in a sequential manner on the outer axle tube along a length direction of the outer axle tube, and a spring pin provided on the telescopic axle tube; and
wherein by adjusting a length of the telescopic axle tube extending out of the outer axle tube, the spring pin is capable of engaging with any of the locking holes.

9. The vehicle dolly as claimed in claim 2, wherein
the main beam is a hollow beam with a rectangular cross-section,
each of the support wheels is positioned on an outer side of the main beam, with an outer side wall of the main beam facing the support wheels, and
each of the guide plates is positioned parallel to the outer side wall of the main beam and abuts against it.

10. The vehicle dolly as claimed in claim 2, wherein an upper end of the guide plate has a mounting portion positioned on an upper side of the main beam, and an upper end of the screw rod is fixedly connected to the mounting portion.

11. The vehicle dolly as claimed in claim 1, wherein the first support wheel is rotatably connected to the first mount assembly, the second support wheel is rotatably connected to the second mount assembly, each mount assembly is movably connected to the main beam through a link arm, and each screw rod and the corresponding nut are detachable from each other, and, once detached, allow a corresponding mount assembly to be moved in a direction towards a middle of the main beam.

12. The vehicle dolly as claimed in claim 11, wherein each link arm has a first end that is a sliding end, which is slidably connected to the main beam along a length direction of the main beam, and each link arm has a second end that is a hinged end, which is hinged to the corresponding mount assembly, enabling the sliding end of each link arm to pivot up and down relative to the hinged end.

13. The vehicle dolly as claimed in claim 12, wherein an outer side wall of the main beam faces the support wheels, a first elongated slot and a second elongated slot are provided on the outer side wall of the main beam, with a length direction of each of the elongated slots being consistent with the length direction of the main beam, and the sliding end of each link arm is slidably connected to one of the elongated slots through a slider.

14. The vehicle dolly as claimed in claim 13, wherein one end of each of the elongated slots is positioned in the middle of the main beam and has a positioning notch for insertion of the slider.

* * * * *